United States Patent [19]

Cooper

[11] Patent Number: 4,809,166

[45] Date of Patent: Feb. 28, 1989

[54] DATA ASSEMBLY APPARATUS AND METHOD

[75] Inventor: Michael Cooper, San Jose, Calif.

[73] Assignee: Advanced Micro Devices, Inc., Sunnyvale, Calif.

[21] Appl. No.: 900,949

[22] Filed: Aug. 27, 1986

[51] Int. Cl.[4] .......... G06F 3/14

[52] U.S. Cl. .......... 364/200; 340/720; 340/750

[58] Field of Search ... 364/200 MS File, 900 MS File; 340/720

[56] References Cited

U.S. PATENT DOCUMENTS

| | | | |
|---|---|---|---|
| Re 312,00 | 4/1983 | Sukonick et al. | 364/900 |
| 3,675,208 | 7/1972 | Bard | 364/900 |
| 3,772,654 | 11/1973 | Evans et al. | 364/200 |
| 3,891,982 | 6/1975 | Cheek et al. | 340/800 |
| 4,069,511 | 1/1978 | Lelke | 364/200 |
| 4,075,695 | 2/1978 | Lelke | 364/200 |
| 4,153,950 | 5/1979 | Nosowicz et al. | 365/231 |
| 4,308,532 | 12/1981 | Murphy | 340/728 |
| 4,321,668 | 3/1982 | Flynn et al. | 364/200 |
| 4,364,025 | 12/1982 | Dalton | 364/200 |
| 4,467,444 | 8/1984 | Harmon, Jr. et al. | 364/900 |
| 4,677,582 | 6/1987 | Nakafugi | 364/715 |

*Primary Examiner*—Gareth D. Shaw
*Assistant Examiner*—Debra A. Chun
*Attorney, Agent, or Firm*—Fliesler, Dubb, Meyer & Lovejoy

[57] ABSTRACT

A data assembler and serializer for use in bit mapped graphics systems where flexible windowing and panning are desired. The unit accepts display memory data as either one 8-bit word or two 4-bit words. Leading and trailing pixels not required in the final bit stream, as indicated by control data, are removed from the words. Remaining pixels are then shifted and concatenated to form a continuous stream of video data. The assembled data words are supplied to a FIFO buffer and from the buffer to a shift register for generating a serial output. Positioned between a display memory and a color palette or monitor, the system supports smooth panning and hardware windows on pixel boundaries.

20 Claims, 3 Drawing Sheets

DATA ASSEMBLY APPARATUS AND METHOD

FIELD OF THE INVENTION

The present invention relates to the assembly of output data words along subword boundaries from a stream of input data words. In particular, the present invention has application for assembling data words to support panning and windowing in video displays.

BACKGROUND OF THE INVENTION

Digital video monitors are organized into an array of pixels that are typically organized into a number of horizontal lines displayed in a raster scanning fashion. There may be hundreds of pixels per line and correspondingly hundreds of lines in a single frame of a video monitor display.

Data characterizing each pixel in the array is stored in a memory such as a video RAM, that is adapted for supplying data for the lines of pixels rapidly. In order to support rapid reading of data, the memory supplies data in multibit words that include data corresponding to a plurality of adjacent pixels in a line. The more bits of data supplied in the multibit word, the fewer accesses to the memory required to display a line.

However, the number of bits in a word defines the granularity of control over reading data from the memory. Windowing or panning of displayed data is thus "jumpy" or "uneven" because the multibit word constrains the granularity of the windowing or panning to multipixel increments.

It is desirable to provide for smooth panning and windowing with a granularity of one pixel per frame of data displayed on a monitor. In the prior art, one pixel per frame granularity could only be supported by actually writing the window or panning data into the memory over the displayed background between each frame. Thus, for 8-pixel words, panning on 1 pixel per frame, data would have to be written to the video memory address of each word that is panned 8 times, 1 time between each frame. This algorithm of updating video data is slow and software-intense.

As video displays achieve faster and faster data rates, there is a need for faster and more adaptable techniques for assembling video data to support panning and windowing.

SUMMARY OF THE INVENTION

The present invention provides an apparatus and a method for assembling multibit words of data from a stream of multibit input words and control signals identifying selected bits in corresponding words. The apparatus and method does not require multiple update accesses to the same location in the memory storing the multibit words and provides subword control over the granularity of updating data within the words.

In one aspect, the present invention is an apparatus comprising an input register means for receiving an input word and corresponding control signal identifying selected bits in the received input word. In addition, a temporary holding register means for storing a plurality of bits of data is provided. Means, in communication with the input register means and the temporary holding register means, for concatenating the selected bits of the word in the input register with the contents of the temporary holding register, supplies a multibit string of data. In addition, a means for supplying a first subset of the multibit string of data to the temporary holding register means is included. In addition, when the number of bits in the multibit string of data is equal to or greater than the desired size of an assembled word, means for supplying a second subset of the multibit string as the assembled word is enabled.

In a second aspect, the present invention provides a method for assembling multibit words of data from an input stream of multibit input words and control signals identifying selected bits in corresponding input words. The method comprises the steps of:

receiving an input word and corresponding control signal identifying a selected portion of the input word;

storing a plurality of bits of data selected from a preceding word or words;

concatenating the selected bits of the input word with the stored plurality of bits of data from the previous word to supply a multibit string of data;

supplying a subset of the multibit string of data as the plurality of bits for a following word; and generating an output assembled word if the number of bits in the multibit string is greater than or equal to a desired number of bits for the output word.

As can be appreciated, the present invention provides a technique and apparatus for merging multibit words on a single bit boundary that is particularly useful in bit-mapped graphics systems where flexible windowing and panning are desired.

DETAILED DESCRIPTION

Figure 1:
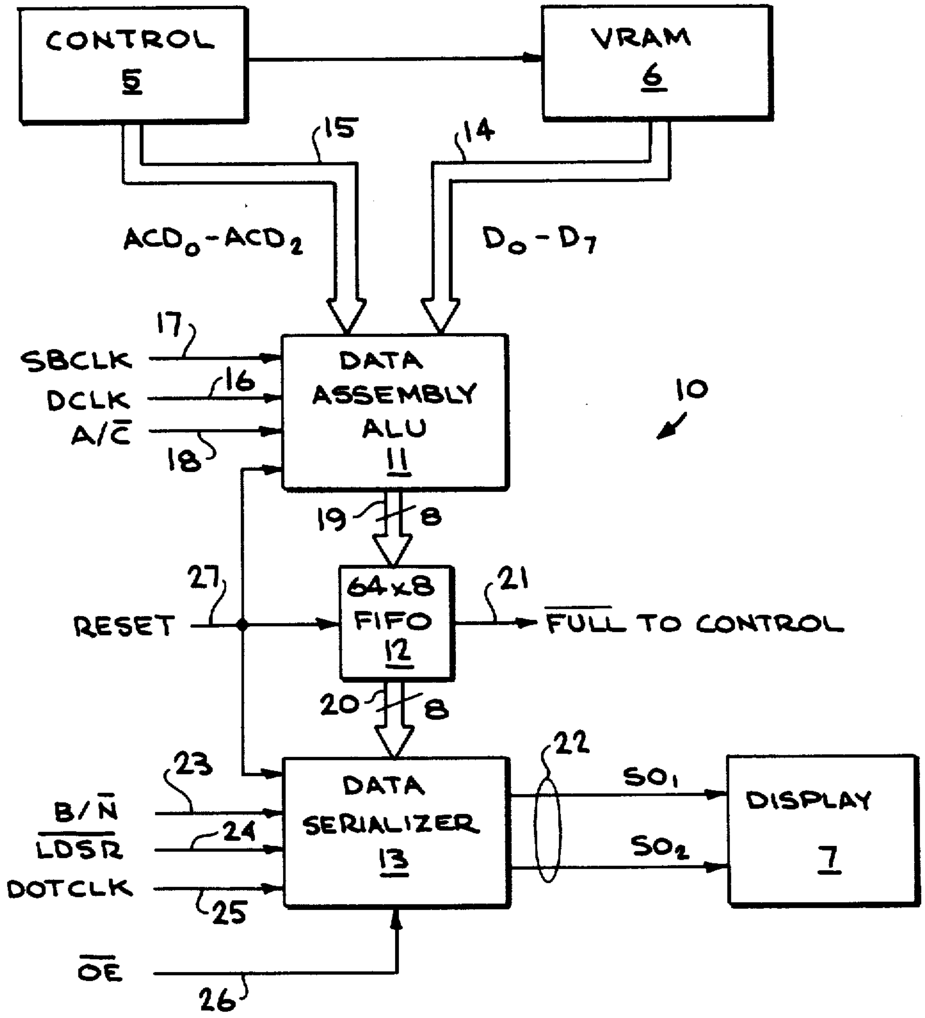
FIG. 1 is an overview block diagram of a preferred implementation of the invention for video data assembly.

The preferred embodiment of the present invention provides a data assembler and serializer for use in bit-mapped graphics systems where flexible windowing and panning are desired. As shown in FIG. 1, in the preferred implementation the data assembler and serializer 10 is positioned between a display memory 6 and a color palette or monitor for a display system 7.

As can be seen in FIG. 1, the data assembler and serializer 10 in the present invention includes a data assembly unit 11, a first/in first out (FIFO) buffer 12, and a data serializer 13.

The data assembly unit 11 is responsible for stripping leading and trailing bits from data words in a stream of data words supplied over bus 14 from the video memory 6. The bits stripped from data words are identified by control signals supplied over bus 15 from a controller 5. A data clock signal on line 16 controls serial input of data words across the bus 14 and control signals across bus 15 into the data assembly unit 11. A start bit clock on line 17 is included for latching control signals across the bus 15 as described in more detail below with reference to FIG. 2.

In addition, the format of the control signal supplied on bus 15 can be altered according to a signal A/$\overline{C}$ on line 18 as described in more detail with reference to FIG. 2.

The output of the data assembly unit 11 is supplied over bus 19 to the FIFO 12. The FIFO 12 buffers the flow of data words and supplies an output across bus 20 to the data serializer 13. The FIFO 12 provides a temporary buffer so that output data words can be provided as a stream of 8-bit parallel bytes on bus 20 after assembly in the data assembler 11. A FIFO full signal is provided on line 21 for supply to the controller 5 to assist in preventing data overflows.

The data serializer 13 is responsible for converting parallel data on bus 20 to serial data. The data is then output across lines 22 to a color palette or similar device in a video display system 7. The serializing process is controlled by external timing and control signals derived from host system signals.

The timing and control signals include B/$\overline{\text{N}}$ on line 23, $\overline{\text{LDSR}}$ on line 24, and DOTCLK on line 25. The functioning of these signals is described in more detail with reference to FIG. 2. An output enable signal on line 26 is supplied in one embodiment of the invention to control the data serializer 13.

In addition, a reset signal is supplied on line 27 for controlling reset of the data assembler and serializer 10.

Figure 2:
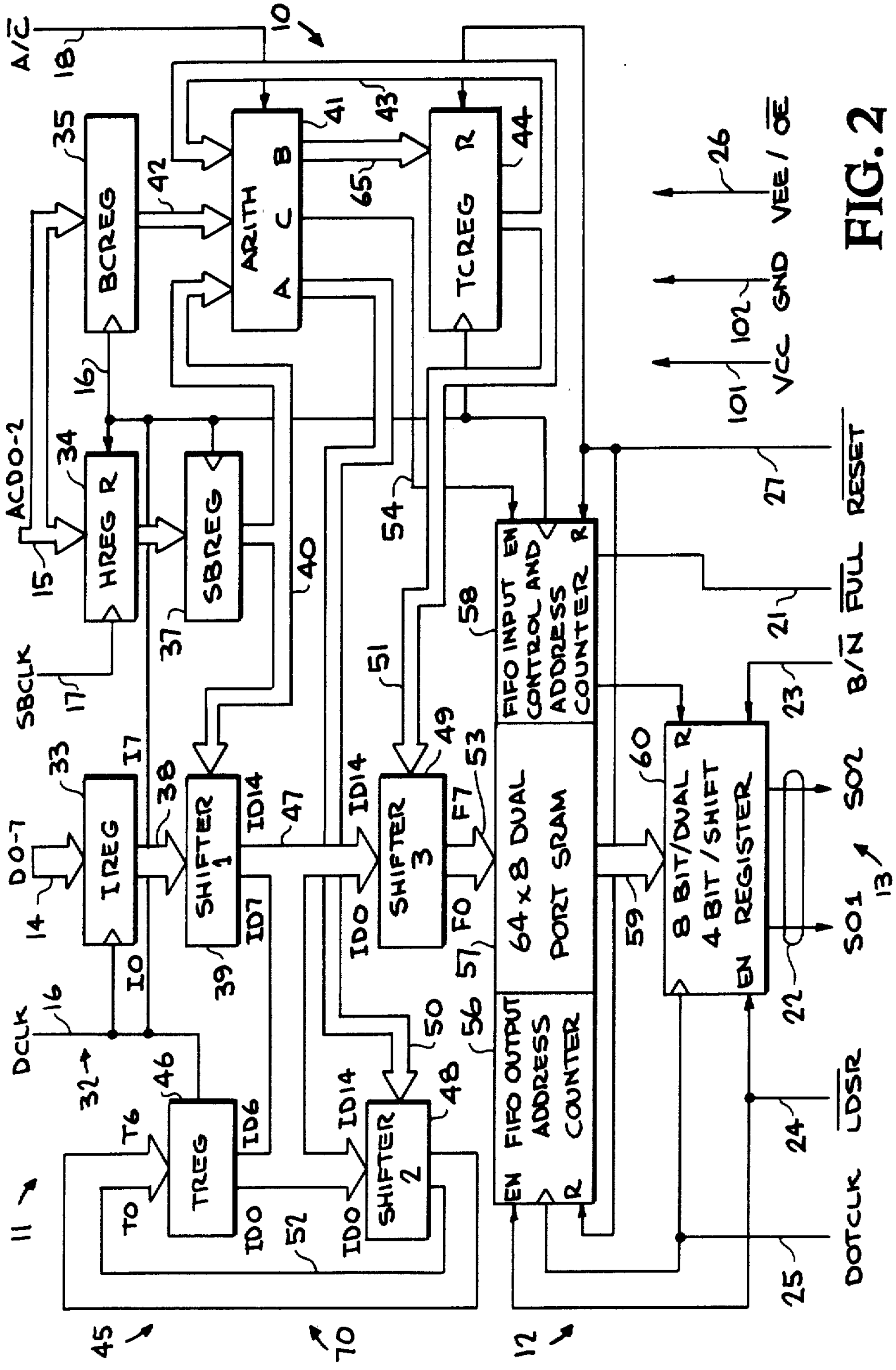
FIG. 2 is a more detailed block diagram showing a preferred embodiment of the present invention.

FIG. 2 provides a more detailed description of a preferred embodiment of the present invention. The inputs and outputs are labeled with the same reference numerals as those shown in FIG. 1 for consistency. A description of the input and output signals is provided as follows:

| | |
|---|---|
| D0–D7 14 | DATA bus inputs - TTL with hysteresis<br>These inputs are used to input the video data that is to be assembled. |
| ADC0–ACD2 15 | ASSEMBLY CONTROL DATA Inputs - TTL with hysteresis<br>These inputs are used to input assembly control data. |
| SBCLK 17 | START BIT CLOCK Input - TTL with hysteresis<br>This input strobes data on ACD0–2 into a Holding Register 34 on a zero to one transition. |
| DCLK 16 | DATA CLOCK Input - TTL with hysteresis<br>This input strobes address or count data on ACD0–2 into the Bit Count Register 35 and data on the D inputs 14 into the Input Register 33 on a zero to one transition. |
| $\overline{\text{FULL}}$ 21 | FIFO Full Output - TTL (Active Low)<br>This output goes to zero when there are 57 or more bytes in the FIFO 12. It will remain at zero until there are fewer than or equal to 56 bytes in the FIFO 12 whereupon it shall go high. |
| $\overline{\text{RESET}}$ 27 | RESET Input - TTL (Active Low)<br>This input when low resets the data assembler and serializer 10. The FIFO 12 is cleared, the Temporary Count Register 44 is set to zero and the Serializer 13 is initialized. |
| VEE/$\overline{\text{OE}}$ 26 | ECL Negative Rail, Output Enable in TTL Version–TTL (Active Low)<br>Enables S01, S02 tristate buffers on TTL version when low. |
| VCC 101 | TTL Positive Rail |
| GND 102 | GROUND |
| B/$\overline{\text{N}}$ 23 | BYTE/NIBBLE Input - TTL<br>This input enables the user to select whether he is inputting data via a single eight bit bus when high or a dual four bit bus when low. |
| A/$\overline{\text{C}}$ 18 | ADDRESS/COUNT Input - TTL<br>When high this input programs the data assembler and serializer 10 to accept a 3 bit end address via the ACD bus 15. When low the system 10 shall accept a 3 bit valid bit count via the ACD bus 15. |
| DOTCLK 25 | PIXEL RATE CLOCK Input - ECL<br>This input is used to load data into or shift data out of the serializer 13. |
| $\overline{\text{LDSR}}$ 24 | LOAD SHIFT REGISTER Input ECL (Active Low)<br>Data is transferred from the FIFO 12 to the shift register 13 on the next zero to one transition of DOTCLK <u>following</u> a one to zero transition of LDSR. |
| S01,S02 22 | SERIAL OUTPUTS - ECL<br>The serialized video data is output via these pins synchronously with DOTCLK. Outputs are tristate buffers in TTL version enabled by VEE/$\overline{\text{OE}}$. |

The data assembly unit 11 includes input register means 32 for storing input data words and corresponding control signals identifying selected portions of an input word. The input register means includes a data input register 33, a holding register 34, and a bit count register 35.

The input data register 33 is coupled to receive 8-bit data words D0–D7 across bus 14 in response to a data input clock 16. The holding register 34 is connected to the control bus 15 to receive start bit control signal in response to the start bit clock 17. The bit count register 35 receives a control signal identifying the number of bits to be received from the input data register 33 in response to the data clock 16. A start bit register 37 is included in addition for reading the data from the holding register 34 in response to the data input clock 16. Thus the contents of the input register means 32 includes a data word in the input data register 33 and control signals in the start bit register 37 and bit count register 35 identifying selected bits in the input data word.

The input register means 32 is coupled to a means 70 for concatenating the selected bits of the input data word with a remainder of bits provided from a previous iteration. The concatenating means 70 includes a first shifter 39, a temporary data register 46, an internal 15 bit wide data bus ID0–ID14 47 and associated control as explained below.

The output of the input data register 33 is supplied across bus 38 to the first shifter 39.

The output of the start bit register 37 is supplied across bus 40 as a control input to the first shifter 39 and as an input to an arithmetic unit 41.

The output of the bit count register 35 is supplied across bus 42 as a second input to the arithmetic unit 41. A third input to the arithmetic unit 41 is supplied across bus 43 from a temporary count register 44.

The temporary count register 44 is included as part of a temporary holding register means generally designated by the numeral 45 for storing a plurality of bits of data. The temporary holding register means 45 includes a temporary data register 46 and the temporary count register 44.

The output of the first shifter 39 provides the 8 rightmost bits of the 15-bit bus 47. The output of the temporary data register 45 supplies the leftmost 7 bits of the 15-bit bus 47.

The 15-bit internal data bus 47 supplies a concatenation of selected bits of the input word with the contents of the temporary data register 45, as an input to a second shifter 48 and to a third shifter 49.

The second shifter 48 is controlled across bus 50 from a first output A of the arithmetic unit 41.

The third shifter 49 is controlled across bus 51 from the temporary count register 44.

The output of the second shifter 48 is connected to supply 7 bits on bus 52 to the temporary data register 46.

The output of the third shifter 49 supplies 8 bits selected in response to the signal on bus 51 as an assembled word across bus 53 to the FIFO 12. The input across bus 53 to the FIFO 12 is controlled by a load signal across line 54 from a third output C of the arithmetic unit 14.

The output of the FIFO is enabled in response to the load shift register signal LDSR on line 24 and reset in response to the reset signal RESET on line 27. It is clocked by the dot clock DOTCLK 25 to supply output data and by the data clock DCLK 16 to read data from bus 53.

The FIFO 12 includes a FIFO output address counter portion 56, a dual port static RAM array 57 for buffering 8-bit words, 64×8 bits in the preferred embodiment, and a FIFO input control and address counter 58.

The output of the FIFO 12 is supplied across bus 59 to an 8-bit or dual 4-bit shift register 60 for serializing the data words. The shift register 60 is clocked by the dot clock DOTCLK on line 25, enabled by the LDSR signal on line 24 and reset by the reset signal RESET on line 27. In addition, the format of the output is controlled by the $B/\overline{N}$ signal supplied on line 23 as described below.

The operation of the data assembler and serializer 10 is described as follows.

On every cycle of the data clock 16, 14 bits of data are loaded into the start bit register 37, the bit count register 35 and the data input register 33. At the same time, results from a previous iteration are loaded into the temporary data register 46, the temporary count register 44, and if enabled, the FIFO 12.

The first shifter 39 shifts data appearing at the output of the data input register 33 to the left. The most significant bits are lost and zeros shifted into the least significant bits. The data is shifted to the left by the number of bits represented by the binary value in the start bit register 37, from 0 to 7 bits. The first shifter therefore aligns the most significant bit desired to be saved from new data with the bit position ID7 in the 15-bit wide ID0–ID14 internal data bus 47. Therefore the first shifter 39 is the means for stripping off the leading unwanted bits from an input data word. After stripping the leading bits off by shifting data to the left, the data is supplied on bus 47 in concatenation with the data from the temporary data register 46.

The number of data bits out of fifteen on bus 47, ID0–ID14, that are desired to be saved can consist of less than, exactly, or more than the 8 bits required for an assembled data word on bus 53. The number of valid bits on the bus 47 in a given iteration is the sum of the valid bit count from the bit count register 35 and the value in the temporary count register 44. These two 3-bit values are summed in the arithmetic unit 41 to generate a 4-bit sum. If there are 8 or more bits in an iteration, then the most significant bit of this sum, labeled C in FIG. 2, will be 1 and will enable data to be loaded into the FIFO at the next DCLK 16 at the end of the iteration. If there are less than 8 bits, then the most significant bit is a zero and no data is loaded into the FIFO.

The three least significant bits of the sum are supplied across bus 65 to the temporary count register 44, representing the number of valid bits that are to be saved in the temporary data register 46 for use in the next iteration.

The second shifter 48 selects 7 consecutive bits from the internal data bus 47, ID0–ID14, and places them on lines T0 through T6 of the bus 52 for supply to the temporary data register. The bit placed on T6 is the least significant bit involved in the present iteration. As data in the input data register 33 is the least significant data involved in the present iteration, and any unwanted leading bits are stripped off by the first shifter 39, then the least significant bit of the iteration placed on T6 is the line ID(7+ (number of bits desired to be saved in input data register 33)−1) of the internal data bus 47. This is the value of A, from the arithmetic unit on line 50 in FIG. 2.

While 7 bits are always saved in the temporary register 46 at the and of an iteration, only that number of bits defined by the temporary count register 44 are valid. The second shifter 48 insures that when data is loaded into the temporary data register 46 it is always aligned with T6 irrespective of how many valid bits are loaded into the temporary data register 46. It can be seen that the least significant (i.e. rightmost) string of bits from the internal data bus 47 that is saved in the temporary data register 46 at the end of an iteration becomes the most significant (i.e. leftmost) string of bits on the internal data bits 47 in the next iteration. It can also be seen that as data in the temporary data register 46 is aligned with T6 and hence ID6 of the internal data bus 47, and data in the input data register is always aligned with ID7 of the internal data bus 47, then the data appearing on the internal data bus is a concatenation of the input data and the string of bits saved in the temporary data register.

The third shifter 49 selects a continuous set of 8 bits of data from the internal data bus 47 for supply across bus 53, F0–F7, to the FIFO 12. The data appearing on F0 is the most significant (leftmost) bit of the valid data on the internal data bus 47. The most significant bit is defined by the number of bits in the temporary data register 46 as indicated by the count in the temporary count register 44. Hence, the third shifter aligns the string of bits so that F0 is equal to ID(7-TCREG), where TCREG is equal to the value in the temporary count register 44. Data appearing on bus 53 will be loaded into the FIFO if there are 8 or more bits valid in this iteration as defined by the signal on line 54.

The FIFO 12 in the preferred embodiment contains 64×8 bits of dual port static RAM 57, an input address counter 58, and an output address counter 56, both of which can be set to 0 by the reset signal on line 27. The FIFO also indicates by asserting the FULL signal on line 21, on the 0 to 1 transition of the data clock on line 16, that there are now 57 bytes in the FIFO. The FULL signal on line 21 will remain low until there are fewer than or equal to 56 bytes in the FIFO 12 whereupon it shall go high again. Bytes are read out of the FIFO 12 and loaded into the shift register 13 by the low to high transition of DOTCLK on line 25 that occurs after a high to low transition of LDSR on line 24. The FIFO output address counter is incremented at this time.

The FIFO input counter 58 is incremented and data is loaded into the FIFO across bus 53 by a 0 to 1 transition of the data input clock DCLK on line 16, only if the most significant bit C on line 54 of the arithmetic unit 41 output is a 1.

The output shift register 13 operates as either a single 8-bit or dual 4-bit shift register as described below. Data is loaded in parallel on the 0 to 1 transition of DOTCLK immediately following a 1 to 0 transition of the LDSR signal on line 24. The data is shifted out on each successive 0 to 1 transition of the DOTCLK from line 25. Zeroes must be shifted into the shift register 13 as the data is shifted out. The outputs 22 designated S01 and S02 are set to a logical zero if there is a shift register underrun, such as may occur during horizontal and vertical retrace periods of a video raster scanning system. When low, RESET must set each stage of the shift register to a zero, asynchronously with the DOTCLK.

When implemented as TTL compatible, the serial outputs S01 and S02 have tristate buffers to allow them to be multiplexed with an alternate data source providing data to a color palette or other system. In an ECL version, the serial loading of zeros should allow an alternate data source to drive the color palette input bus when the shift register is empty.

As mentioned above, the present invention has particular application in supporting smooth panning and hardware windows for raster scanning video displays. In this mode, the data assembler and serializer receives parallel 8-bit words D0–D7 across the input bus 14 in one of the word types listed in Table I.

TABLE I

WORD TYPES

| WORD TYPES | EXAMPLE WORDS | | | | | | | | CONTROL DATA | | |
|---|---|---|---|---|---|---|---|---|---|---|---|
| | $D_0$ | * | * | * | * | * | * | $D_7$ | START BIT ADDRESS | VALID BIT COUNT | END BIT ADDRESS |
| First Word | * | * | * | a | b | c | d | e | 3 | 5 | 7 |
| Middle Word | f | g | h | i | j | k | l | m | 0 | 0 | 7 |
| Last Word | n | o | p | q | r | * | * | * | 0 | 5 | 4 |
| Small Word | * | * | s | * | * | * | * | * | 2 | 1 | 2 |

The first word type listed in Table I requires the first 3 bits as indicated by asterixes to be removed from the start of the word. The middle word type does not require any bits to be removed. The last word type requires bits to be removed from the end of the word. The small word type requires bits to be removed both the start and the end of the word.

Table I also shows the character of control data supplied on the control bus 15. For the first word, the start bit address supplied to the holding register 34 in response to the start bit clock signal 17 shows bit position 3. The number of valid bits, valid bit count, supplied to the bit count register 35 is 5. An alternative form of control signal includes the end bit address for supply to the bit count register 35 which would be 7 for the first word of Table I. The value of the start bit address, valid bit count and end bit address can be seen from Table I for each of the word types provided.

To enable the data assembler and serializer 10 to select only the required data bits from an input word and to assemble one or more blocks of data into a contiguous multibit string, it requires the following control data:

(i) a 3-bit binary value indicating the first bit of data in the word that is valid, 000 indicating bit D0 and 111 indicating D7.

(ii) a 3-bit binary value indicating the number of valid bits in the byte (001=1 bit, 111=7 bits, 000=8 bits). This value is either derived from an end bit address or a valid bit count as described above with regard to Table I. The value A is a 3-bit output from the arithmetic unit 41 on bus 50 which is derived from the bit count.

The data assembler and serializer 10 is based on a pipelined architecture. The data clock on line 16 is used to shift parallel data through two pipeline levels. The first level consists of the input data register 33, the bit count register 35, and the start bit register 37. The second level consists of the FIFO 12, the temporary register 46, and the temporary count register 44. Between these two levels the data is assembled in conjunction with the assembly control data. One iteration cycle consists of loading data and assembly control data into the first level and then loading the results into the second level. As the assembly control data from bus 15 is loaded into the data assembler and serializer 10 via the multiplexed 3-bit control bus 15, the additional holding register 34 is provided to temporarily store the start bit value. Data in the holding register 34 is transferred to the start bit register 37 by the next data clock 16. Thus 6 bits of assembly control data and 8 bits of data are transferred to the outputs of the start bit register 34, bit count register 35, input register 33 on every data clock 16 for supply to the shifters 39 and arithmetic unit 41. Most bytes transferred to the data assembler and serializer 10 start at bit 0. The only byte which might not start at 0 is the first byte of a data stream. As a consequence of this, a start bit value other than 0 needs to be loaded into the holding register 34 only once per data stream. As the data assembler and serializer 10 is primarily intended for use with video RAMs, then the start bit value can be transferred to the holding register 34 during the VRAM transfer cycle which also occurs at the start of each data stream. If the holding register 34 is automatically reset so that the start bit is 0 for all bytes other tan the first, then it is only necessary to transmit a valid bit count with each byte. For simplification of data transfer the valid bit count should be stable at the same time as data so that the same signal (data clock 16) can be used to strobe both sets of data into the data assembler and serializer 10.

The adoption of this scheme avoids the need to either multiplex two 3-bit assembly control parameters at twice the data speed over one 3-bit bus or the use of a 6-bit assembly control bus which requires larger input/output capability.

A similar argument can be put forward regarding the valid bit count. It need only be transmitted with the last byte of the data stream. However by transmitting it with every data byte allows the valid bit count to be strobed in by the data clock 16, thereby saving one control signal. No degradation of system performance occurs by doing this and so it is the adopted method.

To insure that the start bit value is 0, it is only necessary to reset the holding register 34 on every rising edge of the data clock 16. The first data clock rising edge after the start bit clock on line 17 has loaded data into the holding register 34 transfers data to the start bit register 37 and resets the holding register 34 for the next cycle.

The preferred embodiment includes several user accessible resources. These user accessible resources include the ability to accept data via a single 8-bit or dual 4-bit bus 14 and to accept an end address control signal or a valid bit count control signal as shown in Table I.

The single 8-bit or dual 4-bit configuration is controlled by the input signal B/$\overline{N}$. When used with an 8-bit bus, the data assembler and serializer 10 is configured to operate with a single 8-bit parallel in serial out register 13.

When used with two 4-bit buses, the first bit of the control bus 15 must be tied to 0. In addition, data must input to the data assembler and serializer 10 in an interleaved fashion for the assembly process to function correctly. Thus for Word 1 and Word 2, the inputs D0 through D7 are shown below.

D0=W10
Dl=W20
D2=Wll
D3=W21
D4=W12
D5=W22
D6=W13
D7=W23;

where Wln for n=0–3 is data for the first 4-bit bus, and W2n for n=0–3 is data from the second 4-bit bus.

When used in the dual 4-bit mode, the data assembler and serializer 10 must be configured so that the shift register operates as two 4-bit parallel in/serial out shift registers which de-interleave the inputs. The shift register outputs are derived from the data inputs D0 through D7 as follows:

S10=D0
S11=D2
S12=D4
S13=D6
S20=Dl
S21=D3
S2=D5
S23=D7;

where Sln for n=0–3, equals shift register 1 parallel input and S2n for n=0–3, equals shift register 2 parallel input. The first shift register drives output S01 and the second shift register drives output S02. Sln and S2n are output in parallel in the dual 4-bit mode.

The end address/valid bit count feature is programmed by the A/$\overline{D}$ input on line 18. When this signal is high, an external controller is assumed to be sending a 3-bit end address via the control bus 15 identifying the last valid bit in the byte. The data assembler and serializer 10 must internally generate a valid bit count by subtracting the end bit address in the bit count register 35 from the start bit address in start bit register 37. The result must be a 3-bit value where 001 is equal to 1 bit, 111 is equal to 7 bits, and 000 is equal to 8 bits. If the end and start addresses are the same, the subtraction shall yield a value of 1. When A/$\overline{C}$ signal is low, it is assumed that the external controller is transmitting a 3-bit valid bit count via the control bus 15. The data assembler and serializer 10 uses this count in place of the valid bit count as generated by the arithmetic unit in address mode.

Figure 3:
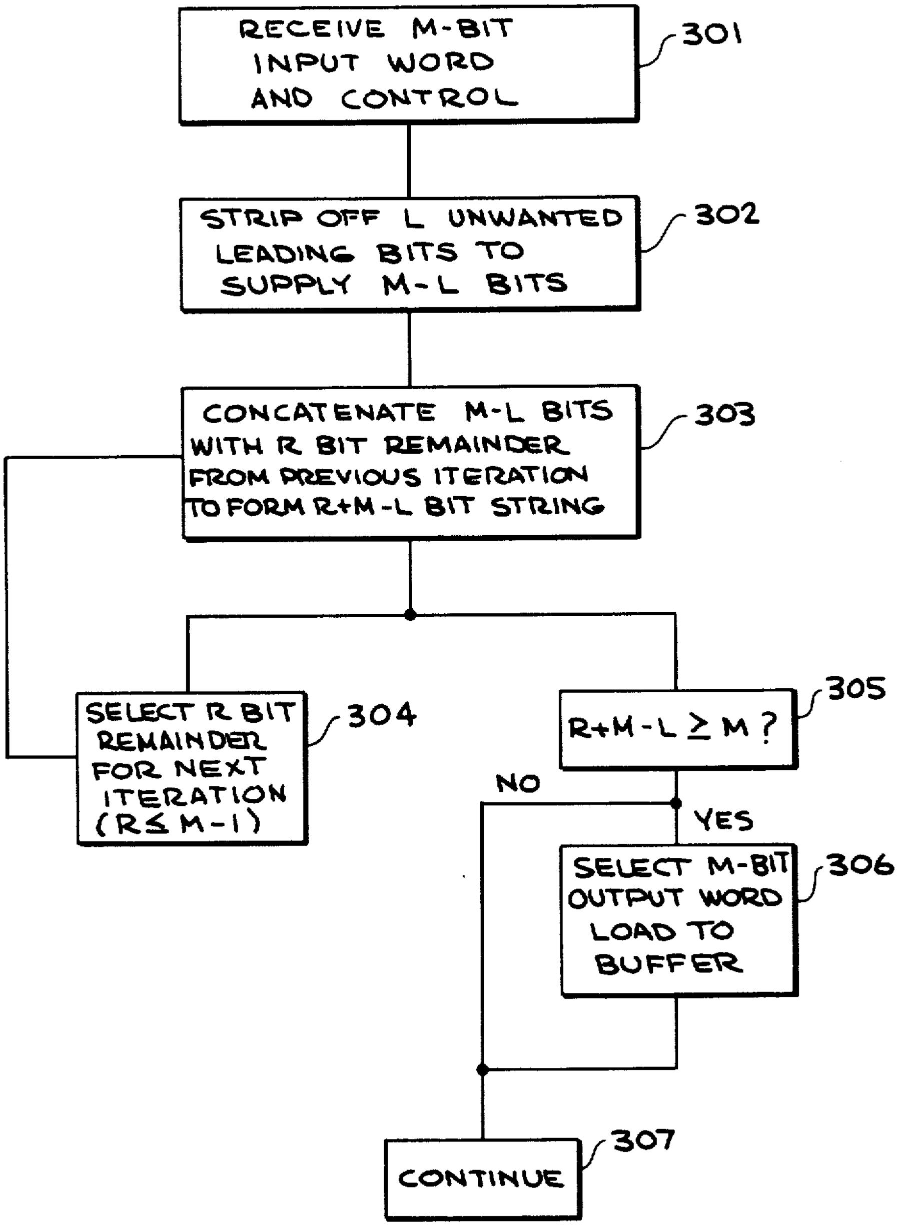
FIG. 3 is a flow chart illustrating a method according to the present invention.

FIG. 3 is a flow chart illustrating a method of assembling data words according to the present invention. As described above, data words are assembled from a stream of input data words by iteratively combining desired bits of an input word with a multibit string remaining from a previous iteration.

Thus, according to the present invention, during each iteration the steps illustrated in FIG. 3 are performed. In the first step an M-bit input word and associated control identifying selected bits of the input word are received (block 301). The next step involves stripping the leading L unwanted bits from the M-bit input word in response to the control signal to supply M-L bits for use in assembly of the output word (block 302). Of course, as mentioned above, typically only the first input word in a stream of words will require stripping off leading bits. Therefore, L can be zero for many input words in certain instances.

In the next step, the M−L bits are concatenated with an R−bit remainder from a previous iteration to form an R+M−L bit string (block 303). In the preferred embodiment, this step of concatenating is accomplished in the first shifter 39 by aligning the most significant bit selected from the input data word with line ID7 of the internal data bus 47 and by supplying the R-bit remainder with its least significant bit aligned with line ID6 of the internal data bus 47.

The next step involves selecting an R-bit remainder from the R+M−L bit string for use in the next iteration, where R is less than or equal to M−1 (block 304). In the implementation described in FIG. 2 of the present invention, this step of selecting an R-bit remainder is accomplished in the second shifter 48 by aligning the least significant bit in the R+M−L bit string with line T6 on bus 52 for supply to the temporary holding register.

In parallel with the step of selecting an R-bit remainder, the step of determining whether R+M−L is greater than or equal to M is performed (block 305). If R+M−L is greater than or equal to M, then the step of selecting an M-bit output word and loading the output word to the buffer is performed (block 306). This embodiment assumes that the size of the desired assembled word is equal to the size M of the input words. Any size output greater than or equal to M can be implemented according to this embodiment. This step of selecting an M-bit output word is performed in the third shifter 49 by aligning the most significant bit of the R+M−L bit string with line F0 of bus 53. If there are at least M bits (M=8 in the embodiment of FIG. 2), the bus 53 will be full for loading to the buffer. This condition is indicated by the output C of the arithmetic unit 41 supplied over line 54 to the FIFO buffer 12.

If R+M−L is not greater than or equal to M, the algorithm continues to the next iteration (block 307). Likewise, after an assembled word is supplied to the buffer, if any, the algorithm continues to the next iteration (block 307).

Conclusion

As shown in FIG. 1, the data assembler and serializer 10 is situated in a graphics system between the display memory 6 and the display 7 which includes typically digital to video converters such as color palettes and the like. While the embodiment shown can be used with 4 and 8-bit bus systems directly, graphic processors are not limited to these bus widths and the present invention can be adapted to handle any desired bus width.

Further, it can be appreciated that the controller 5 could generate any pattern of addresses for the memory 6 for supply on the data input bus 14. Thus the stream of data words across the bus 14 is not limited to locations in the memory 6 that are directly mapped to pixels in the display system 7. The data assembler and serializer 10 can assemble the data without requiring read and write accesses to the location in the memory 6 that corresponds to the display pixel locations. Implementation of the controller 5 is well known within the art. The generation of the control signals on bus 15 are simple modifications of addressing schemes.

The data assembler and serializer 10 according to the present invention supports smooth panning and hardware windows on single pixel boundaries. This is contrasted with traditional systems which support panning and hardware windows on word boundaries with words typically containing data from 4 to 32 pixels.

A system according to the present invention can be adapted to operate at very high rates overcoming many of the problems of prior art panning and windowing systems. Further, the software required for generating the control signals is very simple compared to software intense prior systems for generating windowing and panning video displays.

The foregoing description of the preferred embodiment of the present invention has been presented for the purposes of illustration and description. It is not intended to be exhaustive or to limit the invention to the precise form disclosed. Obviously many modifications and variations will be apparent to the practitioner skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. An apparatus for assembling words of bit map image data for supply to a raster scanning display, the apparatus receiving a stream of input words and control signals identifying selected bits in corresponding input words at intervals defined by clock signals, comprising:

input means for storing an input word and corresponding control signal in a first interval;

temporary means for storing a plurality of bits of data int first interval;

means, in communication with the input means and the temporary means and having an internal bus, for concatenating a subset of the word in the input means with contents of the temporary means in response to the control signal to supply a multibit string of data to the internal bus;

means, in communication with the means for concatenating and the temporary means, fur supplying a first subset of the multibit string as the plurality of bits to the temporary means in a second interval; and means, in combination with the means for concatenating and having an output bus, for supplying a second subset of the multibit string as an assembled word to the output bus in the second interval.

2. The apparatus of claim 1, further including:

means, in communication with the means for concatenating, for generating a load signal if the number of bits in the multibit strip is equal to or greater than a preselected value.

3. The apparatus of claim 2 further including:

means, in communication with the means for supplying the second subset of the multibit string and the means for generating a load signal, for buffering the assembled words in response to the load signal.

4. The apparatus of claim 2 further including:

means, in communication with the means for supplying the second subset of the multibit string and the means for generating a load signal, for buffering the assembled words in response to the load signal; and means, in communication with the means for buffering, for serializing assembled words for supplying to the raster scanning display.

5. The apparatus of claim 1, wherein the input words are bit map image data, and further including:

means, in communication with the output bus, for serializing the assembled words for supply to a raster scanning display.

6. An apparatus for assembling words of image data in clock cycles receiving a stream of input words and control signals identifying selected bits in corresponding input words, comprising:

input means for storing an input word and corresponding control signals;

temporary means for storing a first plurality of bits of data;

means, in communication with the input means, for stripping unwanted leading bits in response to the control signals from the input word to supply a second plurality of bits of data;

means, connected to receive the first plurality of bits of data and the second plurality of bits of data, and having an internal bus for concatenating in a first clock cycle the first plurality of bits with the second plurality of]bits to supply a multibit string of data to the internal bus;

means, connected to the internal bus, for supplying a first subset of the multibit string as the first plurality of bits of data to the temporary means for a following clock cycle; and means, connected to the internal bus and having an output bus, for supplying a second subset of the multibit string as an assembled word to the output bus.

7. The apparatus of claim 6, wherein the means for concatenating includes means for aligning a leftmost bit of the second plurality of bits of data with a rightmost bit of the first plurality of bits of data to supply the multibit string of data;

the means for supplying a first subset selects the first subset from rightmost bits of the multibit string of data; and the means for supplying the second subset includes means for selecting the second subset from a leftmost portion of the multibit string of data.

8. The apparatus of claim 6, further including:

means, in communication with the means for concatenating, for generating a load signal if the number of bits in the multibit string is equal to or greater than a preselected value.

9. The apparatus of claim 8, further including:

means, in communication with the means for supplying the second subset of the multibit string and the means for generating a load signal, for buffering the assembled words in response to the load signal.

10. The apparatus of claim 8 further including:

means, in communication with the means for supplying the second subset of the multibit string and the means for generating a load signal, for buffering the assembled words in response to the load signal; and means, in communication with the means for buffering, for serializing assembled words 11. The apparatus of claim 6, wherein the stream of input words is supplied from a bit map video memory, and further including:

means, connected to the output bus, for serializing the assembled words for supply to a raster scanning display.

12. A method for assembling words of image data for supply to a raster scanning display, from an input stream of input words and control signals identifying selected portions of corresponding input words, comprising the steps of:

receiving an input word and corresponding control signal identifying the selected portion of the input word;

storing a plurality of bits of data selected from a preceding word or words;

concatenating the selected portion of the input word with the stored plurality of bits of data from the previous word or words to supply a multibit string of data to an internal bus;

supplying a first subset of the multibit string of data as the stored plurality of bits for use with following input words; and supplying a second subset of the multibit string of data as an output assembled word to an output bus, if the number of bits in the multibit string is greater than or equal to a desired number of bits for the output assembled word.

13. The method of claim 12 further including the step of:

buffering the output assembled words; and serializing the buffered assembled words.

14. The method of claim 12, wherein the step of concatenating includes the steps of:

stripping unwanted leading bits from the input word;

aligning the resulting leading bits of the input word with a first selected position on a data bus; and aligning the trailing bit of the stored plurality of bits with a second selected position on the data bus, the first selected position trailing and adjacent to the second selected position.

15. For a bit map video display system having a video memory storing a bit map image in the form of at least one sequence of words, each bit in one sequence of the words corresponding to a pixel position in the bit map image, and the video display system further having a controller supplying assembly control words in clock intervals, an apparatus for assembling image data, comprising:

an input, connected to the video memory, for receiving an input word and corresponding assembly control word in a first clock interval;

a temporary storage element for saving a first plurality of bits of image data;

means, connected to the input and to the temporary storage element, for assembling a string of bits of image data in response to the assembly control word, the string of bits of image data consisting of the first plurality of bits and at least a portion of the assembled input word;

means, coupled with the means for assembling, for supplying a first subset of the string of bits of image data to the temporary storage element for a following clock interval;

means, coupled with the means for assembling and including an output bus, for supplying a second subset of the string of bits as an assembled word of image data to the output bus.

16. The apparatus of claim 15, further including:

means, in communication with the means for assembling, for generating a load signal if the number of bits in the multibit string is equal to or greater than a preselected value.

17. The apparatus of claim 16, further including:

means, coupled to the output bus and the means for generating a load signal, for buffering the assembled words in response to the load signal.

18. The apparatus of claim 16 further including:

means, coupled to the output bus and the means for generating a load signal, for buffering the assembled words in response to the load signal; and means, in communication with the means for buffering, for serializing assembled words for supply to the raster scanning display.

19. The apparatus of claim 15, wherein the input words are bit map image data, and further including:

means, in communication with the output bus, for serializing the assembled words for supply to a raster scanning display.

20. The apparatus of claim 15, wherein the means for assembling includes means for aligning a leftmost bit of the second plurality of bits of data with a rightmost bit of the first plurality of bits of data to supply the string of data;

the means for supplying a first subset selects the first subset from rightmost bits of the string of data; and the means for supplying the second subset includes means for selecting the second subset from a leftmost portion of the string of data.

* * * * *